United States Patent
Goode et al.

(10) Patent No.: US 7,296,193 B2
(45) Date of Patent: Nov. 13, 2007

(54) TECHNIQUE FOR PROCESSING AN ERROR USING WRITE-TO-OPERATOR-WITH-REPLY IN A PORTED APPLICATION

(75) Inventors: David Harold Goode, San Jose, CA (US); Thinh Hong, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 10/753,902

(22) Filed: Jan. 7, 2004

(65) Prior Publication Data
US 2005/0188261 A1 Aug. 25, 2005

(51) Int. Cl.
G06F 11/00 (2006.01)
(52) U.S. Cl. .............. 714/57; 714/15; 714/23; 714/48; 714/49; 710/52; 710/57; 711/170
(58) Field of Classification Search ............ 714/15, 714/23, 48, 49, 54, 57; 710/52, 57; 711/170; 719/319
See application file for complete search history.

(56) References Cited

U.S. PATENT DOCUMENTS

| | | | | |
|---|---|---|---|---|
| 4,615,002 A | | 9/1986 | Innes | 364/200 |
| 4,888,690 A | * | 12/1989 | Huber | 707/4 |
| 5,684,992 A | * | 11/1997 | Abrams et al. | 719/314 |
| 6,032,227 A | * | 2/2000 | Shaheen et al. | 711/129 |
| 6,240,486 B1 | | 5/2001 | Ofek et al. | 711/112 |
| 6,260,110 B1 | | 7/2001 | LeCrone et al. | 711/112 |
| 6,289,356 B1 | | 9/2001 | Hitz et al. | 707/201 |
| 6,327,703 B1 | | 12/2001 | O'Donnell et al. | 717/5 |
| 6,397,311 B1 | | 5/2002 | Capps | 711/165 |
| 2002/0040405 A1 | | 4/2002 | Gold | 709/231 |
| 2002/0055923 A1 | | 5/2002 | Kupfer | 707/9 |
| 2002/0152370 A1 | | 10/2002 | Wada | 713/1 |
| 2003/0101193 A1 | | 5/2003 | L'Heureux | 707/101 |
| 2003/0120778 A1 | * | 6/2003 | Chaboud et al. | 709/225 |
| 2003/0167357 A1 | | 9/2003 | Goode | 709/328 |
| 2004/0215619 A1 | * | 10/2004 | Rabold | 707/10 |

OTHER PUBLICATIONS

IBM 445159, "Implementing a method to determine the completion of all console branch entry WTOs and DOMs for a specific job," Research Disclosure, May 2001, p. 863.
"z/OS Availability Features," http://www-1.ibm.com/servers/eserver/zseries/pso/zOSavailability.html.
IBM, OS/390, MVS Programming: Authorized Assembler Services Reference, vol. 4 (SETFRR-WTOR), GC28-1767-09, Eleventh Edition, Dec. 2000, pp. 303-318, downloaded from: http://ranch.state.nd.us/pdf/pdf/iea1a421.pdf.

(Continued)

*Primary Examiner*—Bryce P. Bonzo
*Assistant Examiner*—Charles Ehne
(74) *Attorney, Agent, or Firm*—Fredrik Mollborn

(57) ABSTRACT

A method, apparatus and article of manufacture, implementing the method, processes an error when a write fails in an application that has been ported from a first platform to a second platform. The second platform has a write-to-operator-with-reply call that is not available in the first operating system. The application issues a file write. The application receives an out-of-space error in response to the file write. The application issues a write-to-operator-with-reply call to send a message indicating the out-of-space error to a console.

18 Claims, 6 Drawing Sheets

OTHER PUBLICATIONS

IBM, z/OS UNIX System Services, Porting Guide, Oct. 2002, downloaded from: http://www-1.ibm.com/servers/eserver/zseries/zos/unix/pdf/docs/portbk_v1r4.pdf.

Bob Abrams, "zOS RAS Guidelines and Debug Guide for Ported Software," Nov. 13, 2000.

"Function Descriptions: WTOR," SAS Institute Inc., Cary, NC, USA, 2001, http://support.sas.com/documentation/onlinedoc/sasc/doc700/html/lr1/z2057059.htm.

Steve Pryor, "Storage Strategies, Problem-Solving with ALLOCxx," Technical Support, Jan. 2003, Technical Enterprises, Inc., downloaded from: http://www.naspa.com/PDF/2003/0103/T0301008.pdf.

"DB2 Standards—Operations, Procedures, and Recovery," University Information Technology Services, Database Administration Team, last revised Feb. 8, 2000, http://www.indiana.edu/~dbateam/databases/db2/standards/recover.html.

Judy Ruby-Brown, "DB2 V6 Disaster Recovery by the Book . . . and Then Some," SHARE, Session 1347, Jul. 26, 2000, downloaded from: http://www.share.org/proceedings/sh95/data/S1347.PDF.

* cited by examiner

[Filename] of [Application name] had an out-of-space error.

Respond R to retry or E to exit:

TECHNIQUE FOR PROCESSING AN ERROR USING WRITE-TO-OPERATOR-WITH-REPLY IN A PORTED APPLICATION

BACKGROUND OF THE INVENTION

1. Field of the Invention

The invention relates to a technique, specifically a method, apparatus, and article of manufacture that implements the method, to process an error when a write fails using write-to-operator-with-reply in a ported application.

2. Description of the Related Art

In a computer system, data is typically stored in files in a persistent storage medium such as a hard disk drive. Typically, a file is allocated a predetermined amount of file space for storing data on the hard disk drive. An operating system, and more particularly, a file system within the operating system, typically manages the file space for the files. When new data is to be written to a file, the operating system determines whether the file has sufficient allocated file space to store the new data in that file. If there is sufficient file space, the operating system writes the new data to the file. If the operating system determines that insufficient file space is available for storing the new data in the file, the operating system generates an out-of-space error.

An application program (also referred to as an application) executes on a computer system to perform certain tasks. Applications are typically programmed to execute on a particular operating system. To write data to a file, applications issue a file write which invokes the operating system.

For example, in one mainframe operating system environment, a z/OS® (Registered trademark of International Business Machines Corporation) environment, when an out-of-space error occurs, one application, the IBM® DB2® (IBM and DB2 are registered trademarks of International Business Machines Corporation) database management system, generates an error message and uses Checkpoint/Restart to control recovery processing. Checkpoint/Restart saves the state of an executing application in persistent storage, so that the database management system can be restarted from the point at which it was saved.

In another operating system environment, an AIX® (Registered trademark of International Business Machines Corporation) environment, if the file write fails, the operating system generates an error. In another application that executes in the AIX environment, for example, another database management system, and more particularly, the IBM DB2 Online Analytical Processing (OLAP) Server, if the error is an out-of-space error, the application may terminate. Since the application is a database management system, the termination may leave the data in an inconsistent state. To restore the data to a consistent state prior to when the out-of-space error occurred, a system administrator allocates additional file space for the file associated with the out-of-space error. The system administrator then reloads the data to restore the database's file(s) to the point where the out-of-space error occurred. Restoring files can result in a long outage during which the database management system cannot be used. Outages are undesirable because a business may not be able to process transactions using data that is stored in the database management system.

The term "platform" refers to the operating system and/or the type of computer system on which an application executes. Examples of platforms include, and are not limited to, the WINDOWS® (Registered Trademark of Microsoft Corporation) operating system, the AIX operating system, the UNIX® (UNIX is a Registered Trademark of The Open Group in the United States and other countries) operating system, and the z/OS operating system. The term "port" refers to transferring a computer program, such as an application, from one platform to another.

An application may be ported to an operating system that executes on a mainframe computer to take advantage of the increased processing power. Because an application executing on a mainframe may be able to process even more transactions than the same application executing on the computer from which it was ported, application termination and the associated outage from an out-of-space error is even more undesirable.

One solution may be to add Checkpoint/Restart to the ported application to control recovery processing for out-of-space conditions. However, adding Checkpoint/Restart to the ported application may result in substantial architectural changes to the ported application, and implementation could be time-consuming and error-prone.

Therefore, there is a need for a method, apparatus and article of manufacture implementing the method, for a technique for improved error processing when a write fails in an application that has been ported. In addition, the technique should avoid substantial architectural changes to the ported application. In particular, the technique should improve error processing for an out-of-space error in the ported application.

SUMMARY OF THE INVENTION

To overcome the limitations in the prior art described above, and to overcome other limitations that will become apparent upon reading and understanding the present specification, the present invention discloses a method, apparatus, and article of manufacture, for processing an error when a write fails in an application that has been ported from a first platform to a second platform. The second platform has a write-to-operator-with-reply call that is not available in the first platform. The application issues a file write. The application receives an out-of-space error in response to the file write, and issues a write-to-operator-with-reply call to send a message indicating the out-of-space error to a console.

In this way, a technique provides improved error processing when a write fails in an application that has been ported. In one embodiment, the technique allows an out-of-space error to be corrected and allows processing to continue from the point of failure after action has been taken to correct the out-of-space error. In addition, the technique avoids substantial architectural changes to the ported application.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to some of the figures.

DETAILED DESCRIPTION OF THE PREFERRED EMBODIMENTS

After considering the following description, those skilled in the art will clearly realize that the teachings of the present invention can be utilized to process an error when a write fails in substantially any application that is ported from a first platform to a second platform in which the first platform does not provide a write-to-operator-with-reply call and the second platform provides a write-to-operator-with-reply call. The application issues a file write, and receives an out-of-space error in response to the file write. The application issues a write-to-operator-with-reply call to send a message indicating the out-of-space error to a console.

In another more particular embodiment, if a write fails, the reason for the failure is determined dynamically by the executing application. If the failure is due to an out-of-space error when writing to a file, the application issues a write-to-operator-with-reply call which causes the application to be quiesced until an operator enters a response at a console. In other words, the write-to-operator-with-reply causes the application to be placed in an inactive state until the operator enters a response. In this way, the operator is provided with an indefinite amount of time to alleviate the out-of-space condition before resuming execution of the application. In addition, termination of the application may be avoided and data may be maintained in a consistent state.

Figure 1:
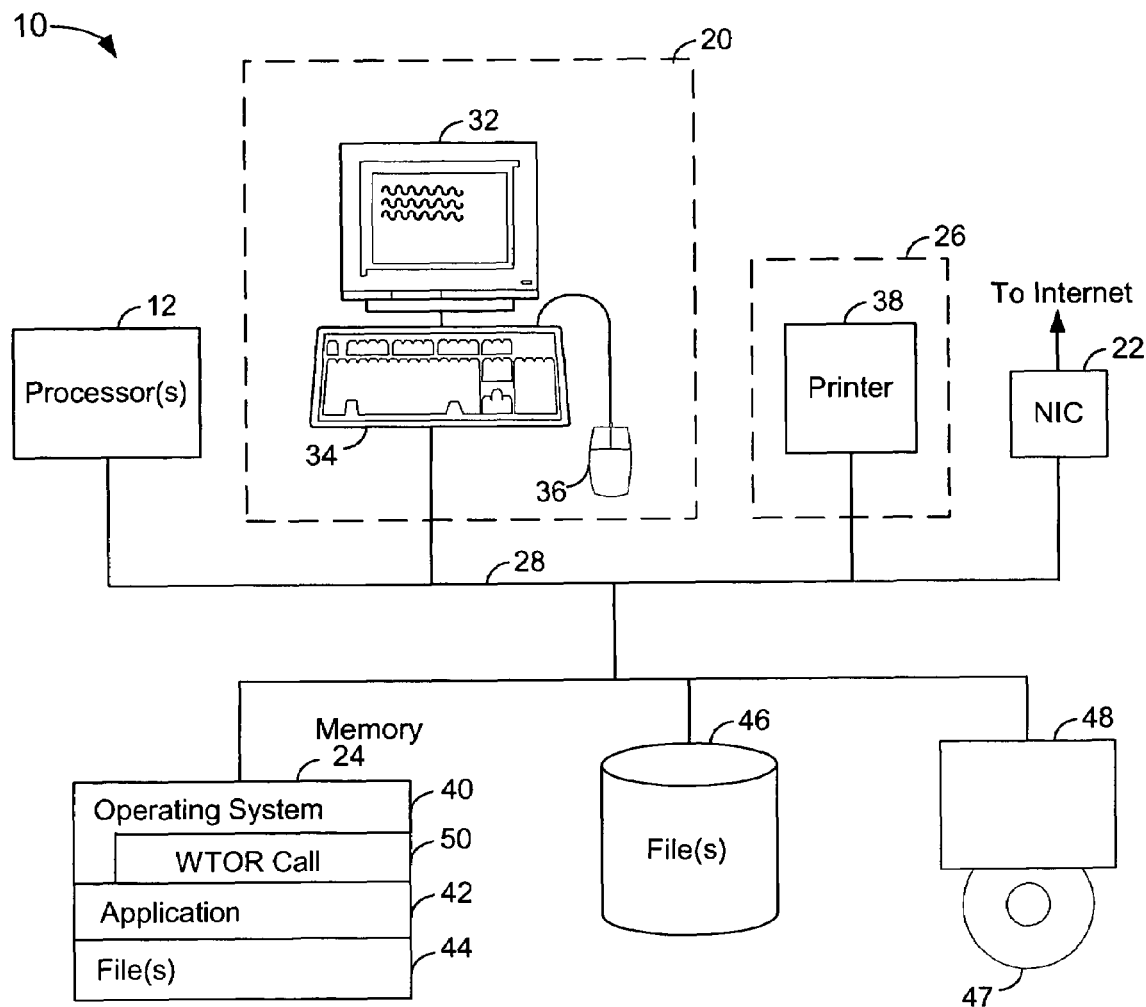
FIG. 1 depicts an illustrative computer system that uses the teachings of the present invention.

FIG. 1 depicts an illustrative computer system 10 that utilizes the teachings of the present invention. The computer system 10 comprises one or more processors 12, a console 20, communications interface 22, memory 24 and output interface(s) 26, all conventionally coupled by one or more busses 28. The console 20 has a display 32, a keyboard 34 and mouse 36. The output interface is a printer 38. The communications interface 22 is a network interface card (NIC) that allows the computer 10 to communicate via a network, such as the Internet. The communications interface 56 may be coupled to a transmission medium such as, for example, twisted pair, coaxial cable or fiberoptic cable. In another exemplary embodiment, the communications interface provides a wireless interface.

The memory 24 generally comprises different modalities, illustratively semiconductor memory, such as, for example, random access memory (RAM), and disk drives. In some embodiments, the memory 24 stores the operating system 40, a ported application 42 and one or more files 44 used by the ported application 42. In another embodiment, at least a subset of the files 44 are stored on a hard disk drive 46. In yet another embodiment, an optical disk 47 for use with an optical disk drive 48 may also store the ported application 42.

The operating system 40 provides a write-to-operator-with-reply (WTOR) call 50. For example, the operating system 40 may be the z/OS operating system. In the z/OS operating system, the WTOR call 50 is implemented as a macro. Alternately, the WTOR call 50 is a command, function, method, procedure, system call, service or facility. The operating system 40 is not meant to be limited to the z/OS operating system. In other embodiments, the operating system 40 can be any operating system that provides a WTOR call.

In one embodiment, the ported application 42 is a database management system. However, the ported application 42 is not meant to be limited to a database management system, and may be substantially any application that writes data to a file.

The present inventive technique is incorporated in the ported application 42. Generally, the ported application 42 incorporating the present inventive technique is tangibly embodied in a computer-readable device, carrier or medium, for example, memory 24, and is comprised of instructions which, when executed, by the one or more processor(s) 12 of the computer system 10, causes the computer system 10 to utilize the present invention.

The present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

Figures 2, 4:
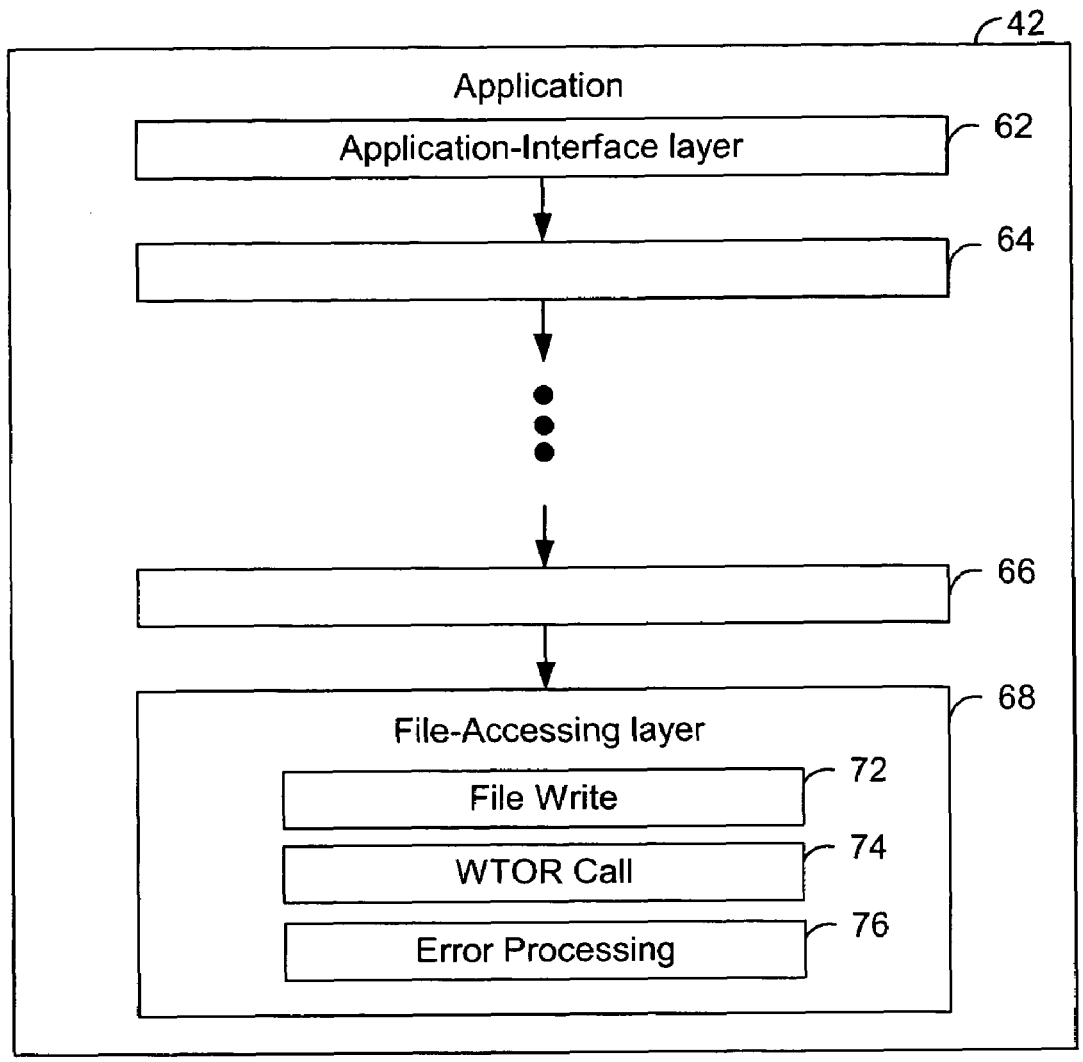
FIG. 2 depicts the layers of an exemplary application which has been ported to the illustrative computer system of FIG. 1 and implements the technique of the present invention.
FIG. 4 depicts an illustrative message sent by an embodiment of the technique shown in the flowchart of FIG. 3 to the console of FIG. 1.

FIG. 2 depicts the layers of an exemplary ported application 42 of the illustrative computer system of FIG. 1. The ported application 42 has an application-interface layer 62 that allows a user or another application to communicate with the ported application. One or more layers of software, 64 to 66, are between the application-interface layer 62 and a lower file-accessing layer 68. In the file-accessing layer 68, a file write 72 is issued. If the file write 72 fails because of an error, the application 42 issues a WTOR call 74. In another more particular embodiment, the error is an out-of-space error. The application 42 is suspended while the WTOR call 74 waits for a reply from the console 20 (FIG. 1). When a reply to the WTOR call 72 is received, error processing 76 is performed in accordance with the reply. In an alternate embodiment, a ported application has a single layer and a WTOR call is issued within that layer.

In another embodiment, to use the WTOR call, an application has a minimum authorization. For example, in one embodiment, the minimum authorization is that an application is Authorized Program Facility authorized, that is, AFP authorized.

Figure 3:
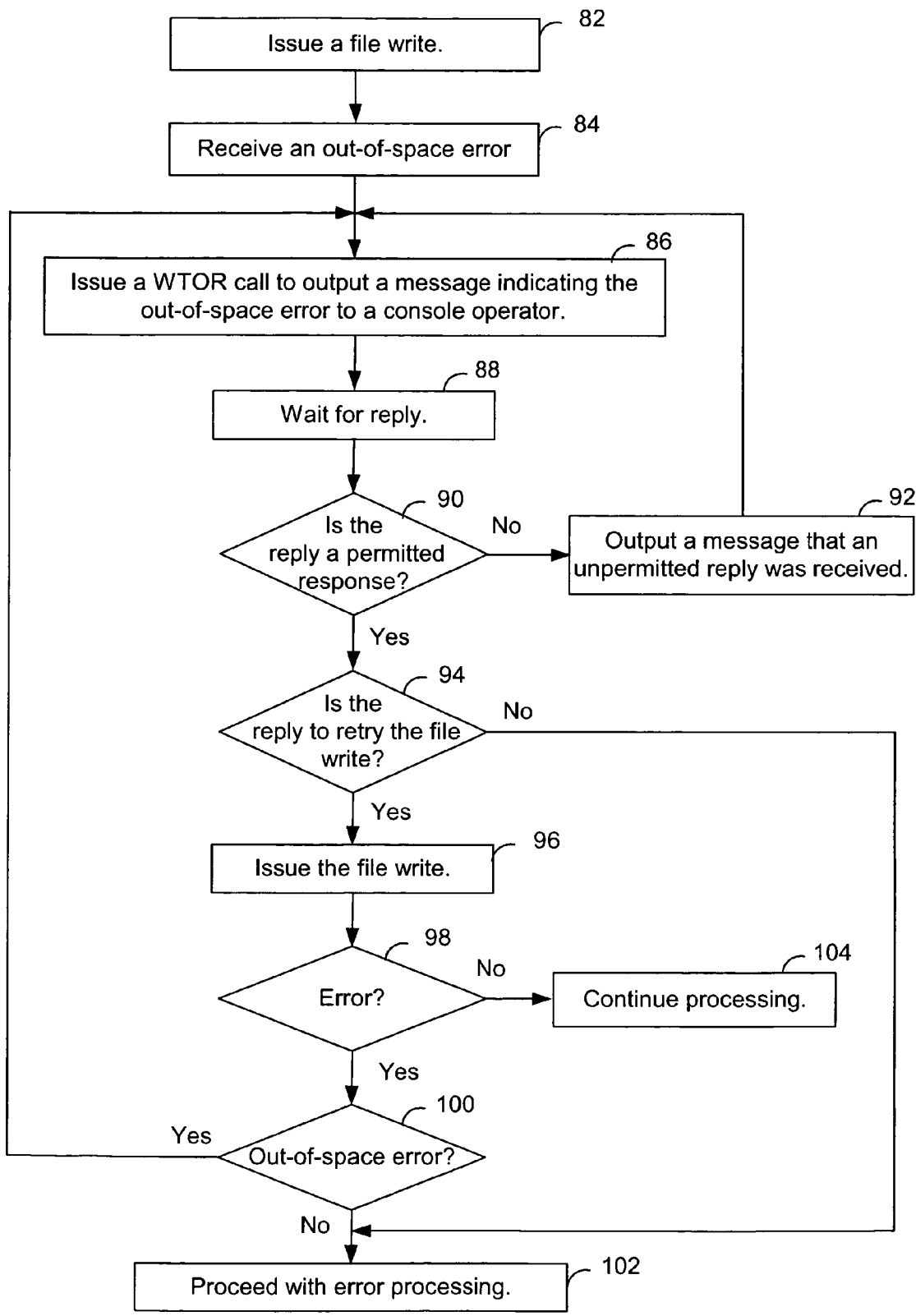
FIG. 3 depicts a flowchart of an embodiment of a technique using a write-to-operator-with-reply call when a write fails in the ported application of FIGS. 1 and 2.

FIG. 3 depicts a flowchart of an embodiment of the present inventive technique implemented in the ported application 42 of FIG. 2. In a more particular embodiment, the present inventive technique is implemented in the file-accessing layer 68 (FIG. 2) of the ported application.

In step 82, the application issues a file write to add new data to a file. In step 84, the application receives an out-of-space error. In step 86, the application issues a WTOR call to output a message indicating the out-of-space error to a console. Referring also to FIG. 4, in response to the WTOR call, the operating system displays a message 110 on the console's display 32 (FIG. 1) to indicate the error. For example, the message specifies the name of the file ([Filename]) and the name of the application ([Application name]) which experienced the out-of-space error. A console operator receives the message and can take action, if desired, to correct the out-of-space error.

In step 88, the application waits for a reply to the WTOR call. At this point, the console operator has an indefinite amount of time to alleviate the out-of-space error. If, in step 88, a reply is received, in step 90, the application determines if the reply is a permitted response. In one embodiment, a permitted response is either a "Y" or an "N", for yes or no, respectively. Alternately, other responses may be permitted. In another embodiment, a permitted response is either "R" or "E", for retry or exit, respectively. A reply of "exit" will subsequently cause the application to proceed with conventional error processing that was used prior to porting. In one embodiment, conventional error processing will cause the application to terminate. If step 90 determines that the reply is not a permitted response, in step 92, the application outputs a message that an impermissible reply was received, and proceeds back to step 86 to issue another WTOR call.

If step 90 determines that the reply is a permitted response, in step 94, the application determines if the reply is to retry the write. If so, in step 96, the application issues the file write. In step 98, the application determines if there was an error in writing the file. If so, in step 100, the application determines whether the error is an out-of-space error. If the error is an out-of-space error, the application proceeds back to step 86 to issue another WTOR call. If the error is not an out-of-space error, in step 100, the application proceeds with error processing. If, in step 98, the application determined that no error occurred, in step 104, the application continues processing.

If, in step 94, the application determined that the reply was not to retry the write, the application continues to step 102 to proceed with error processing. In one embodiment, the error processing of step 102 is the conventional error processing performed by the application prior to porting. In other words, conventional error processing is performed as though the WTOR call had not been issued. Therefore, the out-of-space error may cause the application to terminate and leave the data in an inconsistent state.

For example, in another particular embodiment, an application, such as, a database management system, is ported from the AIX platform to the z/OS UNIX System Services platform on a mainframe computer. In a more particular example, the database management system is the IBM DB2 OLAP Server™ (Trademark of International Business Machines Corporation). The IBM DB2 OLAP Server can access its own data in addition to data from the DB2 database management system and other databases. However, the present inventive technique is used when the application, for example, IBM DB2 OLAP Server, accesses its own data. The mainframe computer may be, for example, an IBM zSeries® (Registered trademark of International Business Machines Corporation) 900.

In the AIX platform, a WTOR call is not available. To inform the operator of an out-of-space error which can be corrected while the application is in a quiesced, restartable state in the AIX platform, complex code would need to be written and added to the application. In the application, the file write is at a lower layer of a stack of procedures. An application-interface layer, or a user interface layer, is implemented at a higher layer than the layer that contains the file write. Without the WTOR call, if an error occurs on a file write, the error would be returned to the various layers of software until the user-interface layer is reached. The user-interface layer would inform a user or console operator of the error. Because the error would be percolated up through the software layers, it would be difficult to go back down through the various software layers to find the exact location where the out-of-space error condition occurred. Therefore, in the application, the added code would also need to track the location of the error.

In contrast, the z/OS operating system provides a WTOR call. Using the present inventive technique, the ported database management system is modified to issue the WTOR call at a low layer where the file write was issued and where the out-of-space error occurred. Using the WTOR call, the application does not need to keep track of the location of the error. When an out-of-space error occurs, the execution of the application is suspended at the layer at which the error occurred, and resumes execution from the layer at which the error occurred without returning the error through numerous layers of software to a user-interface layer.

Figure 5:
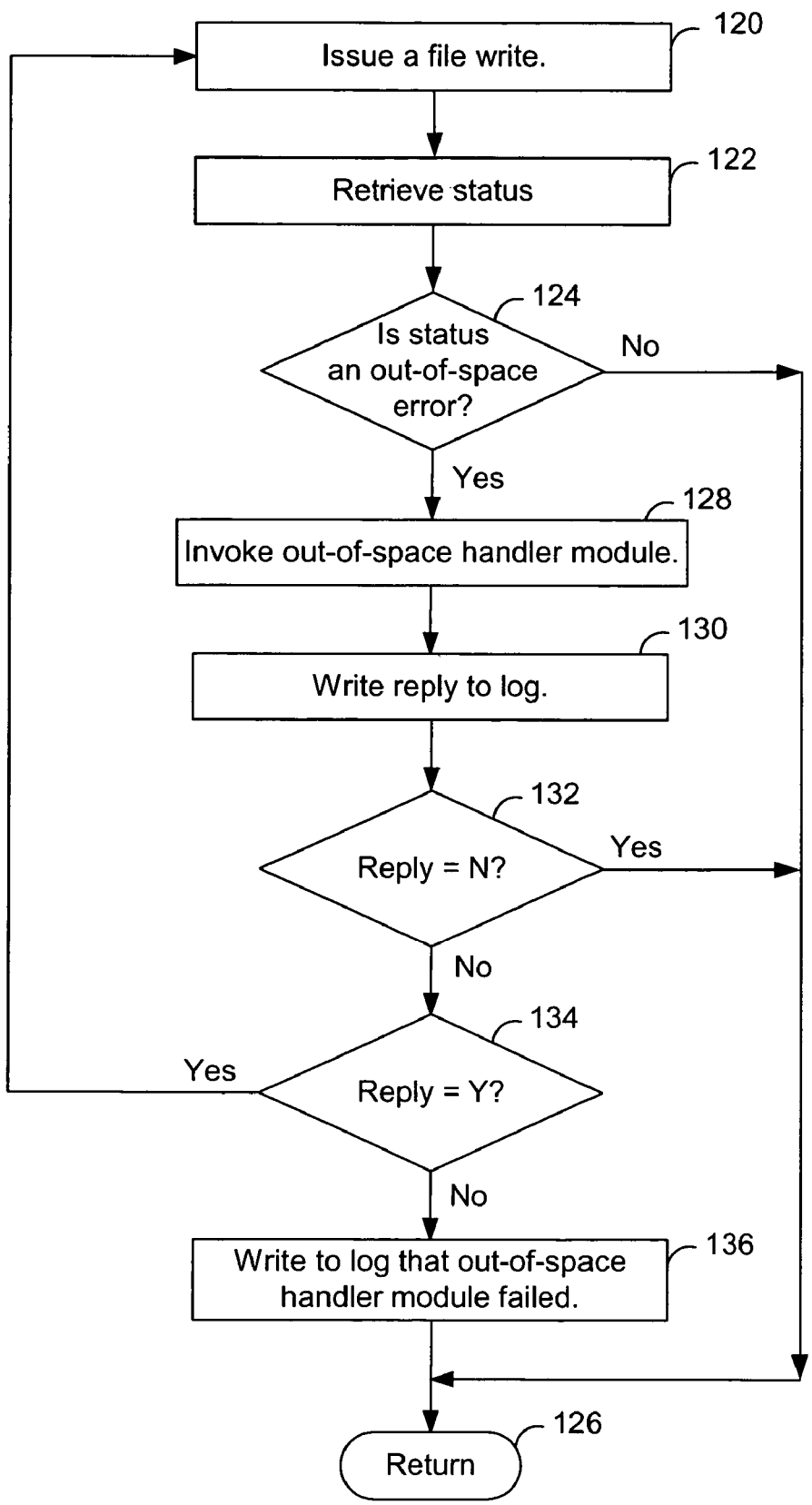
FIG. 5 depicts a flowchart of an embodiment of another technique for processing an out-of-space error after a file write is issued in the application of FIG. 1.
Figure 6:
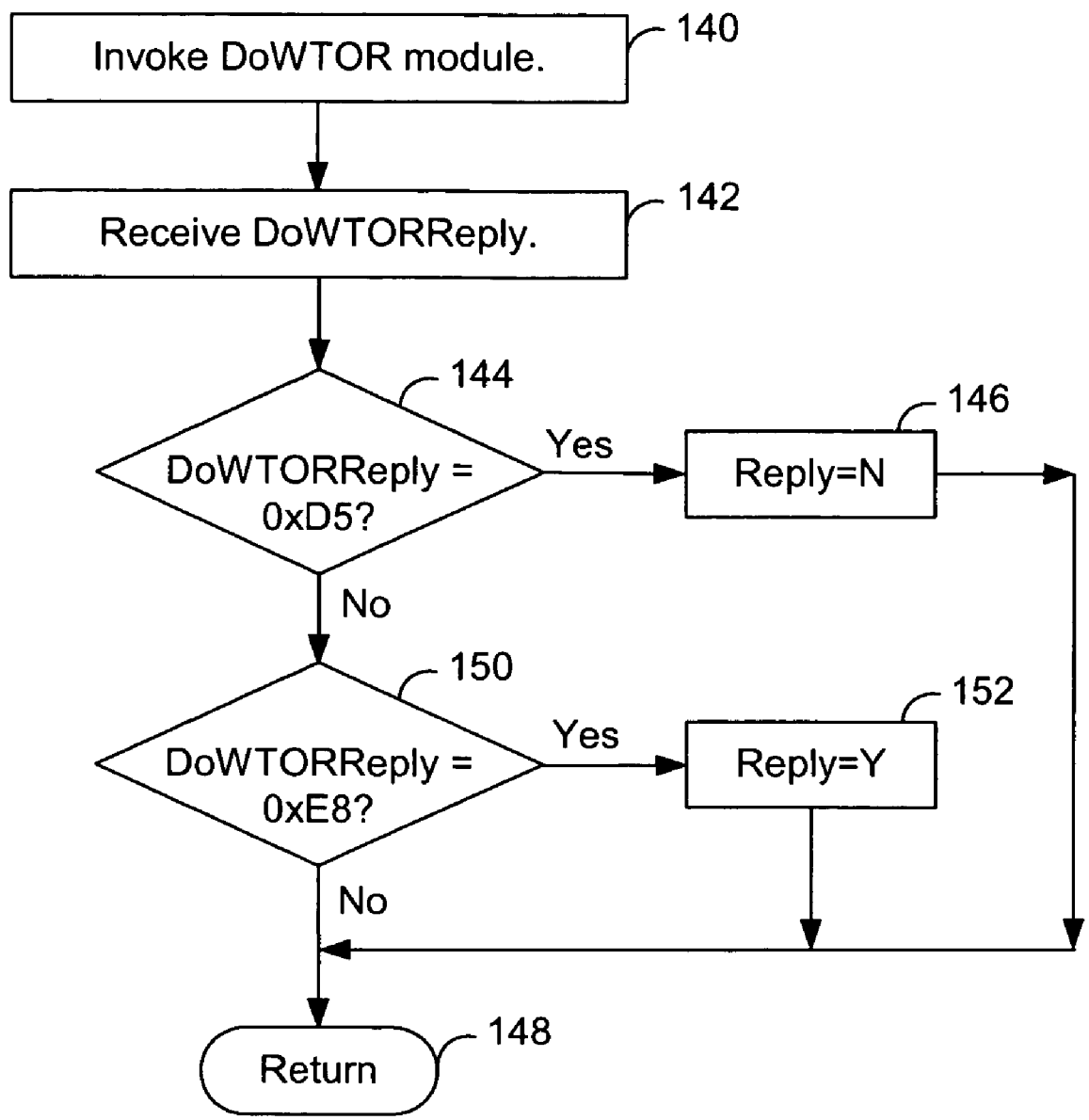
FIG. 6 depicts a flowchart of an embodiment of a technique for processing an out-of-space error in an out-of-space handler module which is invoked in the flowchart of FIG. 5.
Figure 7:
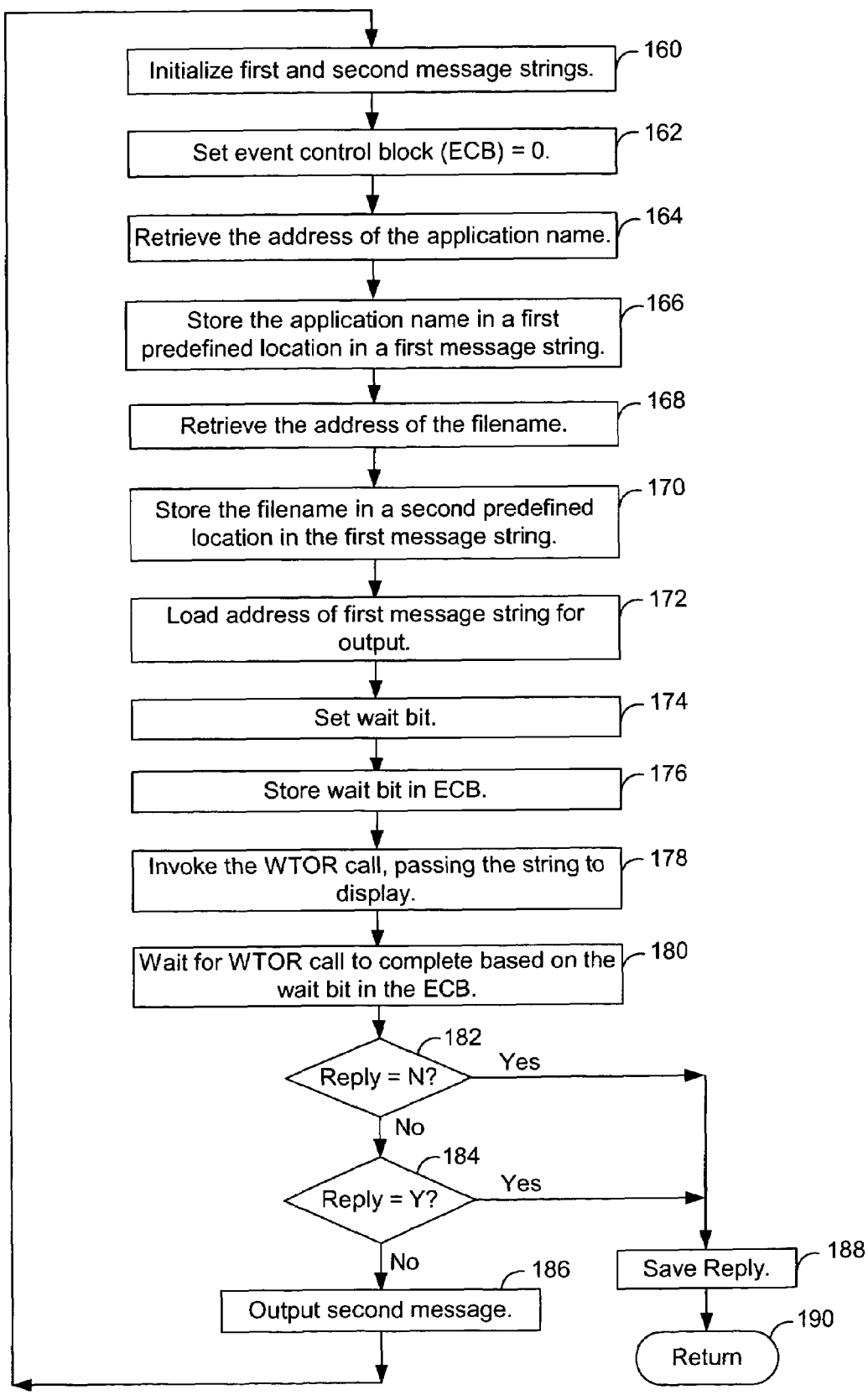
FIG. 7 depicts a flowchart of an embodiment of a technique, which is invoked by the out-of-space handler module of FIG. 6, which issues a WTOR call.

FIGS. 5, 6 and 7 depict flowcharts of an alternate embodiment of the present inventive technique. In FIG. 5, the present inventive technique is implemented in the ported application using a write module that invokes an out-of-space handler module of FIG. 6 which invokes a DoWTOR module of FIG. 7 that invokes the WTOR call. In one embodiment, the write module and out-of-space handler module are written in the C language; and the DoWTOR module is written in assembly language. However, the present inventive technique is not meant to be limited to implementations using the C and assembly languages; in other embodiments, other languages may be used.

The application invokes the write module to write data to a specified file. The write module invokes the out-of-space module upon determining that the write failed because of an out-of-space error. If a reply that is returned from the out-of-space handler module is equal to "Y", for yes, the write module retries the write.

FIG. 5 depicts a flowchart of an embodiment of a technique of the write module for processing an out-of-space error after a file write is issued in the application of FIG. 1. In step 120, a file write is issued. In step 122, the status is retrieved. Step 124 determines if the status indicates that an out-of-space error occurred. If not, in step 126, the write module returns and conventional error processing may be used. If step 124 determines that the status indicates that an out-of-space error occurred, in step 128, the out-of-space handler module is invoked. The out-of-space handler module returns with a reply that indicates whether the file write should be issued again. In step 130, a reply from the out-of-space handler module is written to a log.

Step 132 determines if the reply is equal to an "N." If so, in step 126, the write module returns because a reply of "N" indicates that a write is not to be retried. If step 132 determines that the reply is not equal to an "N," step 134 determines if the reply is equal to a "Y." If so, step 134 proceeds to step 120 to issue the file write again because a "Y" indicates that the write is to be retried. If step 134 determines that the reply is not equal to a "Y," the write module writes that the out-of-space handler module failed to a log, and, in step 126, returns.

FIG. 6 depicts a flowchart of an embodiment of a technique for the out-of-space handler module which is invoked in the flowchart of FIG. 5. In step 140, out-of-space handler module invokes the DoWTOR module. In step 142, the out-of-space handler module receives a DoWTORReply from the DoWTOR module. Step 144 determines if the value of the DoWTORReply is equal to 0×D5, which is the EBCDIC representation for an "N". If so, in step 146, a variable, called Reply, is set equal to another representation of the character "N." For example, in one embodiment, the representation of the variable, Reply, is ASCII; in alternate embodiments, other representations may be used. In step 148, the out-of-space handler module returns and the variable, Reply, is available to the calling module.

If step 144 determines that DoWTORReply is not equal to 0×D5, step 150 determines if DoWTORReply is equal to 0×E8, which is the EBCDIC representation for a "Y." If so, in step 152, Reply is set equal to the ASCII representation of "Y." In step 148, the out-of-space handler module returns. If step 144 determines that DoWTORReply is not equal to 0×E8, in step 148, the out-of-space handler module returns.

FIG. 7 depicts a flowchart of an embodiment of a technique, which is invoked by the out-of-space handler module of FIG. 6, which issues the WTOR call. In one embodiment, the DoWTOR module is an assembly language function that invokes the WTOR call. In alternate embodiments, languages other than assembly language may be used.

In step 160, first and second message strings are initialized. The first message string contains a message, at least in part, that will be output when the WTOR call is invoked. The second message string contains a message that will be output when an impermissible reply is received to the WTOR call. For example, in one embodiment, an impermissible reply occurs when a user enters a character other than "Y" or "N."

In step 162, an event control block (ECB) is set equal to zero. The ECB will be used to determine if a user entered a reply to the WTOR call and the WTOR call completed. In step 164, the address of the application name is retrieved. In step 166, the application name is stored in a first predefined location in a first message string. In step 168, the address of the filename is retrieved. In step 170, the filename is stored in a second predefined location in the first message string. In step 172 the address of the first message string is loaded for output. In step 176, the wait bit is stored in the ECB. In step 178, the WTOR call is issued, passing the string to display. For example, in another embodiment the string is "OUT OF SPACE FOR application name/file name; REPLY "N" TO END OR "Y" TO RETRY." Step 180 waits for the WTOR call to complete based on the wait bit in the ECB.

After the WTOR call completes, steps 182 and 184 check for a valid reply. Step 182 determines if the reply is an "N," which is 0×D5 in EBCDIC. If not, step 184 checks if the reply is a "Y", which is 0×E8 in EBCDIC. If not, in step 186, a second message is output. In one embodiment, the second message indicates that an impermissible reply was received. For example, in one embodiment, the second message is "Y OR N IS THE ONLY VALID RESPONSE." Step 186 proceeds to step 160.

If step 182 determines that the reply is an "N," a valid reply has been received, and, in step 188, the reply is saved to be made available to the calling module. For example, the reply is made available to the out-of-space handler module as DoWTORReply. In step 190, the module returns. If step 184 determines that the reply is a "Y", step 184 proceeds to step 188.

Thus, the present inventive technique allows a console operator to correct an error when a write fails, and then allows the application to continue processing from the point at which the error occurred. Using the present inventive technique, a console operator has an indefinite amount of time to alleviate the error. Because the WTOR call is issued at a low level where the file write is issued, higher level layers of the application are unaware of the error. Furthermore, the present inventive technique avoids termination of an application when an out-of-space error occurs. Therefore, data may be maintained in a consistent state, and reloading the data may be avoided. In addition, the present inventive technique avoids substantial changes to the architecture of the ported application.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. A method of processing an error resulting from a failed file write operation in an application program, the method comprising:
   porting the application program from a first platform to a second platform, wherein the second platform includes a write to operator with reply call that is not available in the first platform;
   issuing a file write operation on the second platform;
   receiving an out-of-space error in response to the file write operation; and
   in response to the out-of-space error, issuing a write to operator with reply call on the second platform to send a message indicating the out-of-space error to a console.

2. The method of claim 1 further comprising:
   receiving a reply to the write to operator with reply call; and
   when the reply is to retry, issuing another file write operation.

3. The method of claim 2 further comprising:
   receiving another out-of-space error in response to the another file write operation; and
   issuing another write to operator with reply call to send another message indicating the out-of-space error to the console.

4. The method of claim 1 further comprising:
   receiving a reply to the write to operator with reply call; and
   when the reply is to not retry, performing error processing as though the write to operator with reply call had not been issued.

5. The method of claim 1 wherein the first platform comprises an AIX operating system and the second platform comprises a z/OS operating system.

6. The method of claim 1 wherein the application program is a database management system.

7. An apparatus for processing an error resulting from a failed file write operation in an application program, comprising:
   a processor; and
   a memory storing the application program, the application program comprising one or more instructions that:
      port the application program from a first platform to a second platform, wherein the second platform includes a write to operator with reply call that is not available in the first platform;

issue a file write operation on the second platform;

receive out-of-space error in response to the file write operation; and in response to the out-of-space error, issue a write to operator with reply call on the second platform to send a message indicating the out-of-space error to a console.

8. The apparatus of claim 7 wherein the application program further comprises one or more instructions that:

receive a reply to the write to operator with reply call; and when the reply is to retry, issue another file write operation.

9. The apparatus of claim 8 wherein the application program further comprises one or more instructions that:

receive another out-of-space error in response to the another file write operation; and issue another write to operator with reply call to send another message indicating the out-of-space error to the console.

10. The apparatus of claim 7 wherein the application program further comprises one or more instructions that:

receive a reply to the write to operator with reply call; and when the reply is to not retry, perform error processing as though the write to operator with reply call had not been issued.

11. The apparatus of claim 7 wherein the first platform comprises an AIX operating system and the second platform comprises a z/OS operating system.

12. The apparatus of claim 7 wherein the application program is a database management system.

13. An article of manufacture comprising a computer program readable storage medium embodying one or more instructions executable by a computer for performing a method of processing an error resulting from a failed file write operation in an application program, the method comprising:

porting the application program from a first platform to a second platform, wherein the second platform includes a write to operator with reply call that is not available in the first platform;

issuing a file write operation on the second platform;

receiving an out-of-space error in response to the file write operation; and in response to the out-of-space error, issuing a write to operator with reply call on the second platform to send a message indicating the out-of-space error to a console.

14. The article of manufacture of claim 13, the method further comprising:

receiving a reply to the write to operator with reply call; and when the reply is to retry, issuing another file write operation.

15. The article of manufacture of claim 14, the method further comprising:

receiving another out-of-space error in response to the another file write operation; and issuing another write to operator with reply call to send another message indicating the out-of-space error to the console.

16. The article of manufacture of claim 13, the method further comprising: receiving a reply to the write to operator with reply call; and when the reply is to not retry, performing error processing as though the write to operator with reply call had not been issued.

17. The article of manufacture of claim 13 wherein the first platform comprises an AIX operating system and the second platform comprises a z/OS operating system.

18. The article of manufacture of claim 13 wherein the application program is a database management system.

* * * * *